United States Patent
Brouwer et al.

(10) Patent No.: US 7,698,993 B2
(45) Date of Patent: *Apr. 20, 2010

(54) APPARATUS AND METHOD FOR PREPARING A BEVERAGE FIT FOR CONSUMPTION WITH A FINE-BUBBLE FROTH LAYER

(75) Inventors: Gustaaf Frans Brouwer, Nijkerk (NL); Hendrikus Christinus Maria Wessels, Uithoorn (NL); Antonius Cornelis Hubertus van der Pluijm, Eindhoven (NL)

(73) Assignee: Sara Lee/DE N. V., Utrecht (NL)

(*) Notice: Subject to any disclaimer, the term of this patent is extended or adjusted under 35 U.S.C. 154(b) by 1368 days.

This patent is subject to a terminal disclaimer.

(21) Appl. No.: 11/011,646

(22) Filed: Dec. 13, 2004

(65) Prior Publication Data
US 2005/0139082 A1 Jun. 30, 2005

Related U.S. Application Data

(63) Continuation of application No. PCT/NL03/00426, filed on Jun. 12, 2003.

(51) Int. Cl.
*A47J 31/00* (2006.01)
(52) U.S. Cl. ............... 99/323.1; 99/275; 99/279
(58) Field of Classification Search ........... 99/452–455, 99/279–323.1, 275, 495, 516
See application file for complete search history.

(56) References Cited

U.S. PATENT DOCUMENTS 5,615,602 A * 4/1997 Schmed ............... 99/323.1
6,119,582 A * 9/2000 Akkerman-Theunisse et al. .................. 99/323.1

FOREIGN PATENT DOCUMENTS

| DE | 40 37 366 | 5/1992 |
|----|-----------|--------|
| DE | 4213895 | 11/1992 |
| EP | 0 719 514 | 7/1996 |
| EP | 0 878 158 | 11/1998 |

OTHER PUBLICATIONS

Translation of DE 4037366 generated by an automated process provided by esp@cenet, 6 pages.

* cited by examiner

*Primary Examiner*—Timothy F. Simone
(74) *Attorney, Agent, or Firm*—Foley & Lardner LLP

(57) ABSTRACT

An apparatus for preparing a beverage fit for consumption with a fine-bubble froth layer, such as coffee or milk with a fine-bubble froth layer, provided with a beverage unit for dispensing under pressure a beverage to be processed, at least one nozzle, which is in fluid communication with the beverage unit for feeding the beverage to the nozzle to generate a jet of the beverage by means of the nozzle, and a collecting unit, into which the jet squirts to obtain the beverage with the fine-bubble froth layer. The collecting unit is then provided with a tubular chamber with at least one open end for dispensing the beverage with the fine-bubble froth layer, the nozzle and the collecting unit being in fluid communication with each other such that the jet squirts against an inner wall of the tubular chamber for beating, in the tubular chamber, air into the beverage to obtain the beverage with the fine-bubble froth layer, which, in use, leaves the tubular chamber via the at least one open end.

18 Claims, 4 Drawing Sheets

APPARATUS AND METHOD FOR PREPARING A BEVERAGE FIT FOR CONSUMPTION WITH A FINE-BUBBLE FROTH LAYER

CROSS REFERENCE TO RELATED APPLICATIONS

The present application is a continuation of PCT/NL03/00426, filed Jun. 12, 2003 which claims priority from Netherlands Patent Application No. 1020834, filed Jun. 12, 2002.

BACKGROUND

The invention relates to an apparatus for preparing a beverage fit for consumption with a fine-bubble froth layer, such as coffee or milk with a fine-bubble froth layer, provided with a beverage unit for dispensing under pressure a beverage to be processed, at least one nozzle, which is in fluid communication with the beverage unit for feeding the beverage to the nozzle to generate a jet of the beverage by means of the nozzle, and a collecting unit, into which the jet squirts to obtain the beverage with the fine-bubble froth layer.

The invention also relates to a method for preparing a beverage fit for consumption with a fine-bubble froth layer, such as coffee or milk, a liquid jet comprising a beverage to be processed being generated and the liquid jet being fed to the collecting unit so that the jet squirts into the collecting unit to obtain the beverage with the fine-bubble froth layer.

The invention also relates to an assembly of the nozzle and the collecting unit.

Such an apparatus and method are known from European patent application EP 0 878 158.

In the known apparatus, the collecting means is provided with a buffer reservoir, which, in this example, comprises a bottom with raised side walls. In use, the jet squirts into the buffer reservoir, which is thus filled with the beverage to be processed. A liquid surface is thus formed in the buffer reservoir. The liquid jet squirts into the liquid surface, air being beaten into the beverage so that a fine-bubble froth layer is formed. The buffer reservoir is further provided with an outlet path for discharging from the buffer reservoir the beverage with the fine-bubble froth layer.

After some time, the squirting of the beverage into the buffer reservoir stops. In the example, the buffer reservoir will subsequently empty. The buffer reservoir may, in the example, be provided with specifically arranged outflow openings in a bottom of the buffer reservoir.

Although in the known system a desired quality of beverage with a fine-bubble froth layer is formed, it is a drawback that it takes some time before the buffer reservoir has emptied completely. In particular the attendant dripping after may take a relatively long time. When, for instance with the known apparatus and according to the known method, one cup of coffee is prepared, the emptying of the buffer reservoir and the dripping after may take half a minute. The dripping after itself may take twenty seconds.

BRIEF SUMMARY OF THE INVENTION

The invention contemplates providing an apparatus and a method with which to provide a solution to the problem pointed out.

According to a first aspect of the invention, the apparatus is correspondingly characterized in that the collecting unit is provided with a tubular chamber with at least one open end for dispensing the beverage with the fine-bubble froth layer, the nozzle and the collecting unit being in fluid communication with each other such that the jet squirts against an inner wall of the tubular chamber for beating, in the tubular chamber, air into the beverage to obtain the beverage with the fine-bubble froth layer, which, in use, leaves the tubular chamber via the at least one open end.

Through impact of the jet against the inner wall of the tube and the possibly following turbulent liquid flow in and through the tubular chamber, air is beaten into the beverage. Because no layer of liquid needs to be built up, as in the buffer reservoir, the tubular chamber may, if desired, empty very rapidly after the feeding of the jet to the tubular chamber has been stopped. In order that the dripping after be relatively short, the tubular chamber must be able to empty rapidly. The at least one open end must only be sufficiently large to enable this, and this is possible, if desired, because the size of the at least one open end has no relevant functional meaning. The problem of the dripping after may thus be strongly reduced.

According to another aspect of the invention, the apparatus is characterized in that the collecting unit is provided with a swirl chamber with at least one outlet opening for dispensing the beverage with the fine-bubble froth layer, the nozzle and the collecting unit being in fluid communication with each other such that the jet squirts against an inner wall of the swirl chamber for beating, in the swirl chamber, air into the beverage to obtain the beverage with the fine-bubble froth layer, which, in use, leaves the swirl chamber via the at least one outlet opening. When swirling the beverage, air is beaten into the beverage to obtain the beverage with the fine-bubble froth layer. Because, in contrast with the buffer reservoir, the swirl chamber need not be filled with a layer of liquid, this chamber may, after the squiring of the jet into the swirl chamber has been stopped, empty relatively rapidly, if desired, the dripping after being relatively short.

In particular, the swirl chamber is of tubular design, the chamber being provided with at least one open end, which comprises the at least one outlet opening.

Preferably, it holds that the tubular chamber is provided with two open ends. As a result, for instance per open end, one cup can be filled with the beverage provided with the fine-bubble froth layer. Two consumptions are thus prepared simultaneously.

In particular, it holds that the collecting unit or a fluid connection between the nozzle and the tubular chamber is provided with at least one air inlet for, in use, drawing air into the chamber. This ensures that no air needs to be drawn in via the at least one open end of the tubular chamber. This at least one end may actually at least partly be in use to discharge the beverage from the tubular chamber so that the feed of air can be impeded.

Preferably, it holds that the nozzle and the collecting unit are mechanically connected with each other. In particular, the nozzle and the collecting unit may then be of integral design. As a result, a liquid flow path extending through the nozzle and to and through the tubular member may be kept relatively short, which has the advantage that after the feeding under pressure of the beverage to a nozzle has been stopped, the apparatus contains relatively little beverage, which, moreover, can leave the apparatus relatively rapidly via the at least one open end, which again means that the emptying of the apparatus and the attendant dripping after can occur within a relatively short time.

The method according to the invention is characterized in that the collecting unit is provided with a tubular chamber with at least one open end for dispensing the beverage with the fine-bubble froth layer, the jet being fed to the chamber so that it squirts against an inner wall of the chamber for beating, in the chamber, air into the beverage to obtain the beverage with the fine-bubble froth layer, which subsequently leaves the chamber via the at least one open end.

BRIEF DESCRIPTION OF THE DRAWINGS

The invention will be explained in more detail with reference to the drawing.

In this drawing:

FIG. 6b shows the holder with the nozzle of FIG. 6a;

FIG. 6c shows a part of the collecting unit according to FIG. 6a;

FIG. 7b shows the holder with nozzle according to FIG. 7a; and

FIG. 7c shows a part of the collecting unit of FIG. 7a.

DETAILED DESCRIPTION OF THE INVENTION

Figure 1:
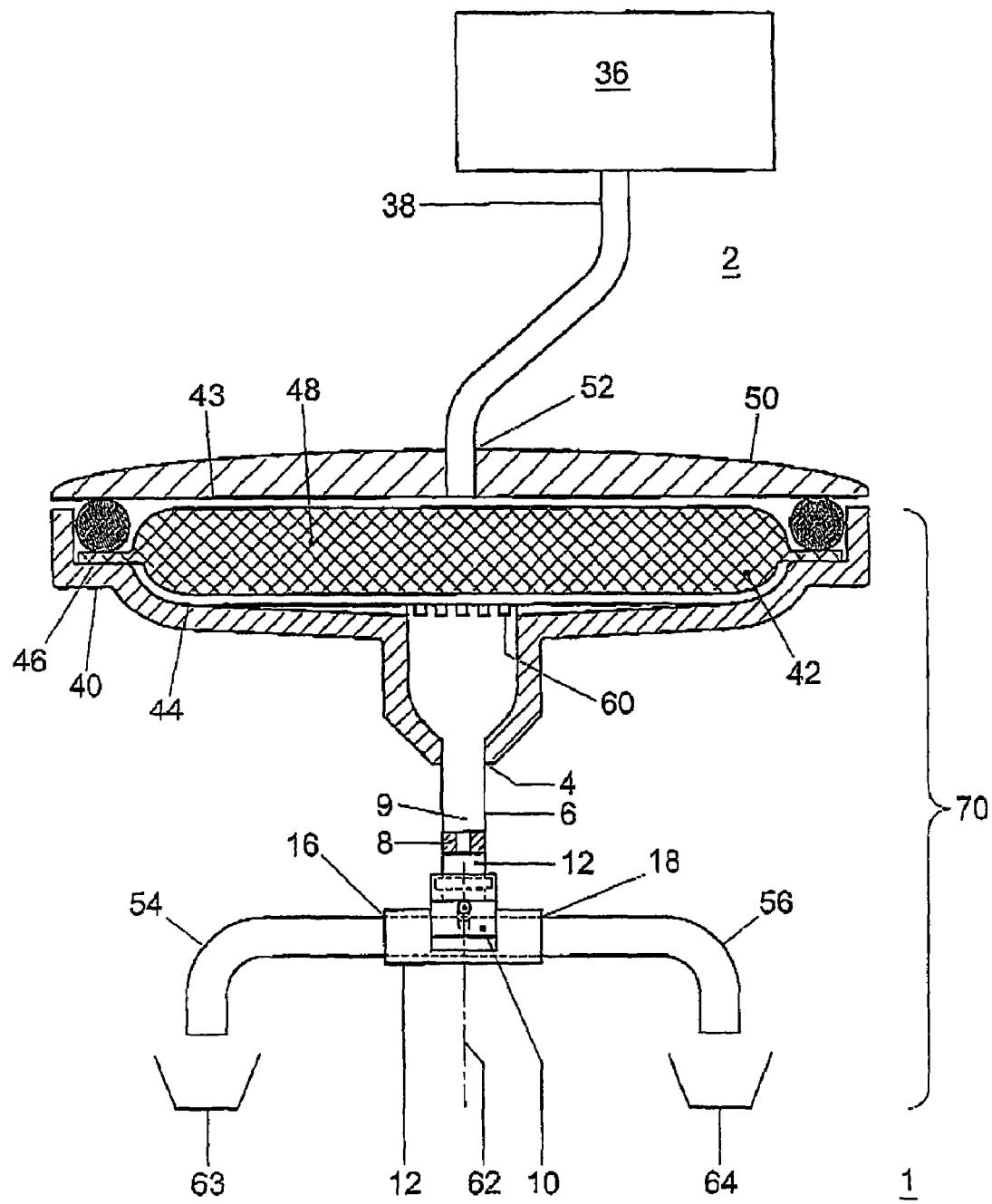
FIG. 1 shows a possible embodiment of an apparatus according to the invention for preparing coffee with a fine-bubble froth layer.
Figure 3:
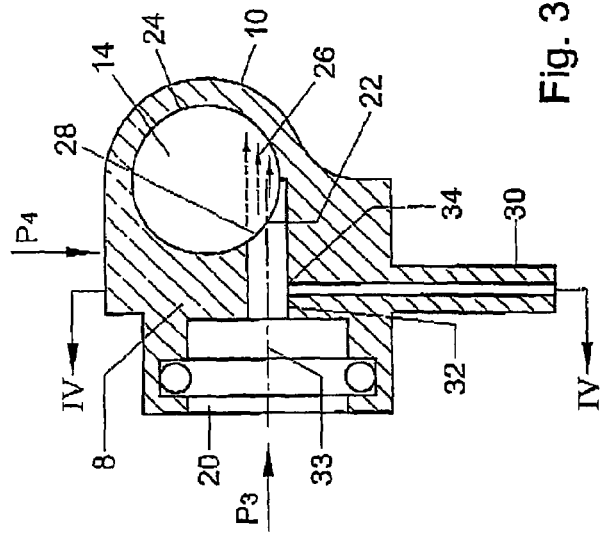
FIG. 3 shows a cross-section of the collecting unit according to FIG. 2.
Figure 2:
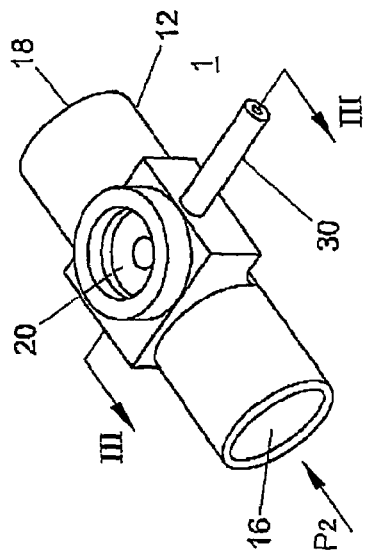
FIG. 2 shows a view of a possible embodiment of a collecting unit of the apparatus according to FIG. 1.

In FIG. 1, reference numeral 1 denotes an apparatus for preparing a beverage fit for consumption. The beverage fit for consumption, such as coffee or milk, is provided with a fine-bubble froth layer. The invention is provided with a known per se beverage unit 2 for dispensing under pressure a beverage to be processed. The beverage prepared by the beverage unit 2 is, in this example, fed from an outlet 4 via a conduit 6, in which a nozzle 8 is included, to a collecting unit 10. The nozzle 8 is therefore in fluid communication with the beverage unit 2 for feeding the beverage generated by the beverage unit 2 to the nozzle for subsequently generating a jet of the beverage by means of the nozzle. The nozzle is provided with an inlet 9 and a spray mouth 12. The apparatus is further provided with the collecting unit 10, into which the jet squirts to obtain the beverage with a fine-bubble froth layer.

The collecting unit 10 is provided with a tubular chamber 14 with a first open end and a second open end 18. The collecting unit is provided with an inlet 20, which is connected with the conduit 6 and a beverage feed opening 22, which discharges into the chamber 14. Included between the conduit 6 and the inlet 20 is an O-ring 21 to provide a fluid seal between the conduit 6 and the inlet 20. The tubular chamber 14 is provided with an inner wall 24, which, in this example, is substantially designed according to the shape of a body of revolution. In this example, the tubular chamber 14 substantially has the shape of a cylinder.

The nozzle is oriented relative to the collecting unit in such a manner that, in use, the jet 26 is directed tangentially to the inner wall. The inner wall 24 is provided with the beverage feed opening 22 for feeding the jet from the nozzle 8. A fluid connection between the nozzle 8 and the tubular chamber is provided with an air inlet 30 for, in use, drawing air into the chamber 14. An inner wall 32 of a liquid flow channel 33, which, in this example, extends in the collecting unit from the inlet 20 to the beverage feed opening 22, is provided with an air feed opening 34, which forms part of the air inlet 30 for feeding air to the chamber 14.

The beverage unit 2 of FIG. 1 may be designed as described in European patent 0 904 717. This beverage unit 2 will therefore be explained herein only briefly. The beverage unit 2 is provided with a hot water unit 36 for dispensing under pressure hot water to a conduit 38. The beverage unit 2 is further provided with a holder 40, in which a coffee pad 42 is included. The coffee pad 42 is, in this example, provided with an upper sheet of filtering paper 43 and a lower sheet of filtering paper 44, which are connected with each other near their longitudinal edges 46. The coffee pad is filled with ground coffee 48. The assembly of holder 40 and coffee pad 42 is closed with a cover 50, which is provided with a feed opening 52 for feeding under pressure, via the conduit 48, hot water dispensed by the hot water unit 36. The holder 40 is provided with the outlet 4, which, via the conduit 6, is in fluid communication with the inlet 20 of the collecting unit 10.

Figure 4:
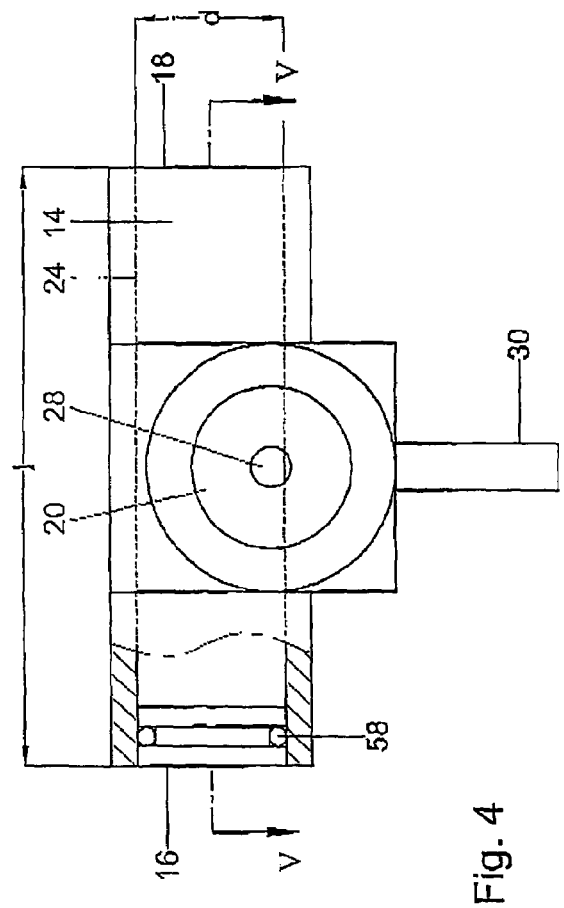
FIG. 4 shows a cross-section of the collecting unit according to FIG. 2.
Figure 5:
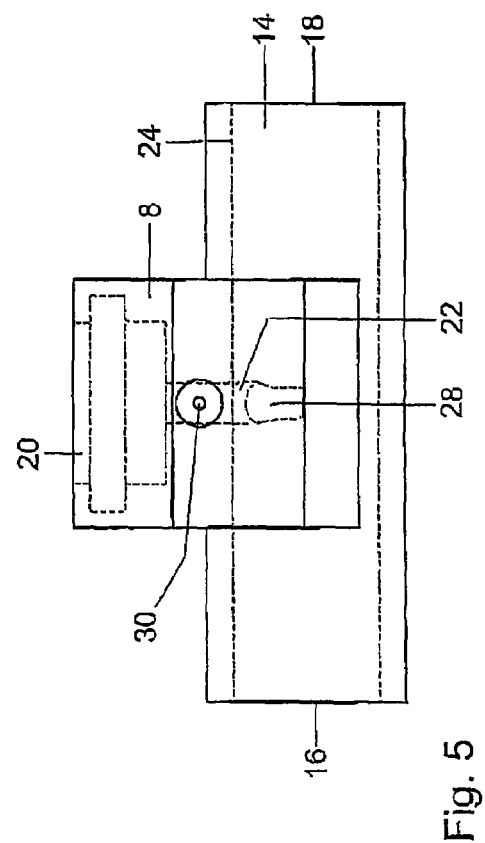
FIG. 5 shows a cross-section of the collecting unit according to FIG. 2.

As can be seen in FIG. 1, the first open end 16 is further connected with a first beverage dispensing tube 54, and the second open end 18 is further connected with a second beverage dispensing tube 56. The first beverage dispensing tube 54 is connected by means of a seal (an O-ring) with the first open end 16 (see FIG. 4). Something similar applies to the second open end with respect to the second beverage dispensing tube 56.

The hitherto described apparatus operates as follows. The hot water unit 36 starts dispensing hot water to the conduit 38. The pressure thereof is, for instance, 1.4 atmospheres (above the atmospheric pressure). The hot water is fed via the conduit 38 to an upper side of the assembly of the holder 44 and the pad 42. The hot water is thus fed to an upper side of the pad. This hot water will be pressed through the pad. In the pad, the ground coffee is extracted so that a coffee extract is formed. This coffee extract will leave the pad through the lower filtering paper 44 under the influence of the pressure of the hot water unit 36. The coffee extract then flows through grooves 60, which are provided in a bottom of the holder 42, to the outlet 4. In this manner, the coffee extract, that is to say the beverage fit for consumption to be processed in this example, which beverage is not yet provided with a fine-bubble froth layer, is fed via the conduit 6 to the nozzle 8. Thus is generated, by means of the nozzle 8, the jet 26 of the beverage. This jet 26 squirts via the conduit 6 and the liquid flow channel 33 into the tubular chamber 14. More in particular, the jet squirts against the inner wall 24 of the tubular chamber 14. Through the impact of the jet 26 against the inner wall 24, the jet 26 is deflected, and turbulences arise within the chamber 14. Simultaneously, via the air inlet 30, air is fed to the jet 26. Because between the nozzle 8 and the tubular chamber 14, a fluid connection is formed which, with the exception of the air inlet 30, is hermetically sealed from the outside world, the liquid jet, in the fluid connection, will generate a reduced pressure so that air is drawn in. Through the above turbulences in the chamber, air is beaten into the beverage so that a beverage with a fine-bubble froth layer is formed. This beverage leaves the tubular chamber via the first open end 16 and the second open end 18. Because, in this example, the tubular chamber 14 is mirror symmetric around the axis 62 indicated in FIG. 1, the beverage with the fine-bubble froth layer will leave the collecting unit 10 while equally distributed over the first open end 16 and the second open end 18 so that two cups 63, 64 filled from respectively the conduits 54 and 56 are filled to an equal extent.

Subsequently, the hot water unit 36 stops dispensing hot water under pressure. As a result, the nozzle will stop generating the jet 26. When the jet 26 has stopped, the chamber 14 may then empty rapidly via the first open end 16 and the second open end 18. In this example, the chamber has a diameter d of about 4 mm and a length l of about 16 mm. Smaller and greater dimensions are also conceivable. With the selected dimensions, this means, however, that the collecting unit has emptied within 5 seconds and that the dripping after into the cups 63 and 64 will only take a few seconds, for instance 5 to 6 seconds. The collecting unit therefore has, on the one hand, the possibility of forming a beverage with a fine-bubble froth layer of a desired quality, and, on the other hand, if desired, at small dimensions the collecting unit has the effect that the dripping after is substantially shortened.

It is noted that the chamber 14 may also function as a swirl chamber for beating in air. The diameter d of the chamber will then be, for instance, 1-3 cm. At these greater diameters, the beverage may swirl around along the inner wall in tangential direction. With these swirls, too, turbulences occur so that air is beaten in, all this quite analogous to what has been discussed before. The tubular chamber may therefore also be designed as a swirl chamber.

Figure 6A:
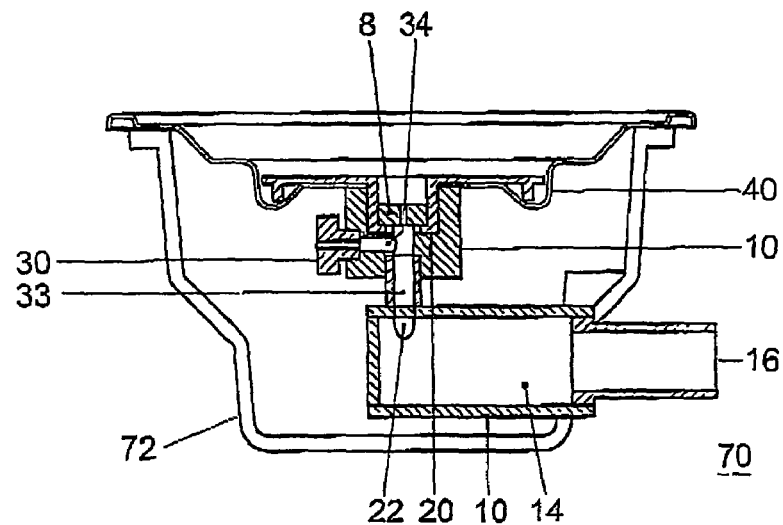
FIG. 6a shows an alternative embodiment of a unit of FIGS. 1-5, which unit is formed by a holder for receiving a coffee pad, a nozzle and a collecting unit 10.
Figure 6B:
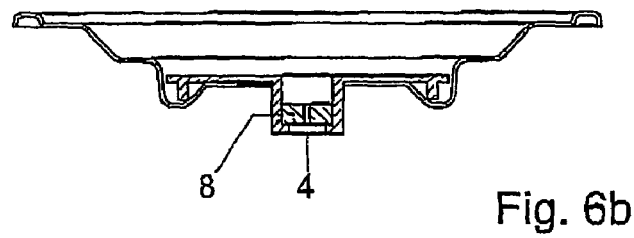
Figure 6C:
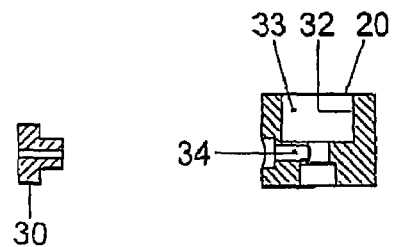

In FIG. 1, the holder 40 and the collecting unit 10 are mechanically connected with each other via the conduit 6, in which the nozzle is included, and together they form a unit 70. In FIG. 6a, an alternative embodiment of such a unit 70 is shown. The unit 70 is also provided with a holder 40, in which a coffee pad can be received. Included upstream of the outlet 4 is, in this example, the nozzle 8. The nozzle 8 is therefore recessed in a bottom of the holder 40. The outlet 4 is directly connected with the inlet 20 of the collecting unit 10. The liquid flow channel 33 extends through the collecting unit 10, from the inlet 20 to the beverage feed opening 22. The inner wall 32 of the liquid flow channel 33 is provided with the air feed opening 34, which forms part of the air inlet 30 (see FIG. 6c). The collecting unit 10 is, in this example, also provided with a tubular chamber 14, which, as is also the case with FIGS. 1-5, is of cylindrical design. The operation of the unit 70 is quite analogous to what has been discussed in relation to FIGS. 1-5.

The unit 70 is further provided with a housing 72, which is connected with the holder 40 and which encloses the collecting unit 10.

In this example, it is also found that the tubular chamber 14 is now only provided with one open end 16.

Figure 7A:
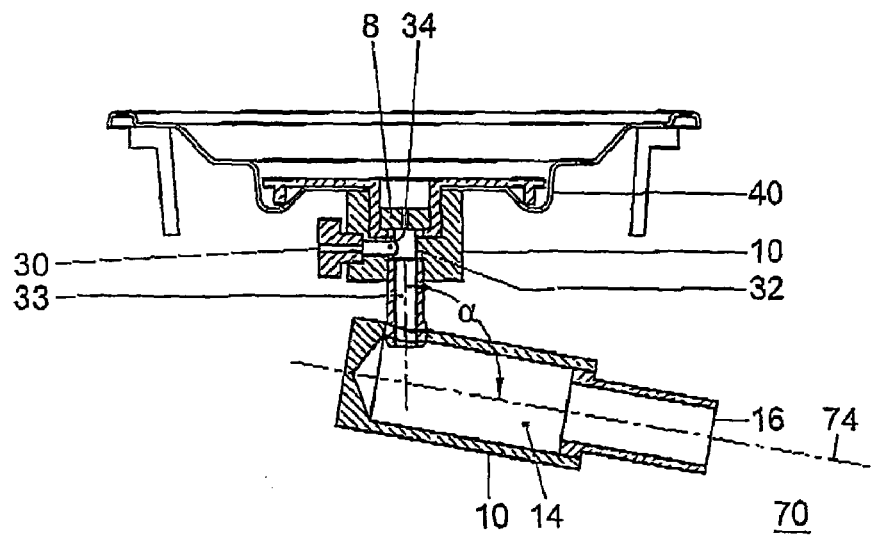
FIG. 7a shows a third embodiment of a unit consisting of a holder, a nozzle and a collecting unit according to the invention.
Figure 7B:
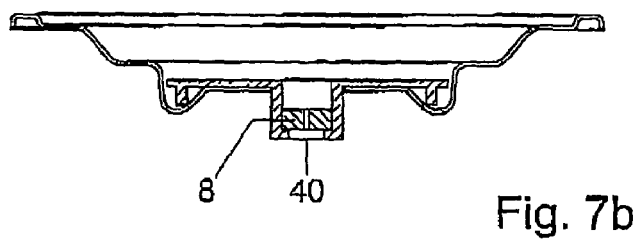
Figure 7C:
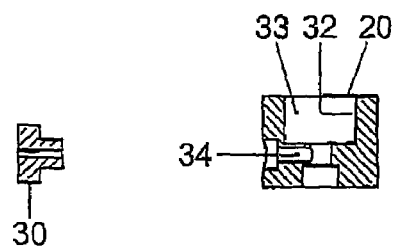

In FIG. 7, a third alternative embodiment of a unit 70 is shown. In this figure, parts corresponding to FIGS. 1-5 are provided with the same reference numerals. A difference with the unit 70 according to FIG. 6a is that an axial axis 74 of the tubular chamber 14 is now inclined downward in the direction of the outflow opening 16. This has the advantage that, after the preparation of the beverage fit for consumption with the fine-bubble froth layer, residual liquid can easily flow out of the tubular chamber 14. In the example of FIG. 7, the unit 70 is now not provided with a housing 72. The tubular chamber 14 may, in this example, be rotatably connected to the liquid flow channel 33 so that the angle α between the axial axis 74 and the vertical may be varied, if desired. Here it is even possible that the axial axis 74 is directed vertically. Preferably, however, it holds in that case that the liquid flow channel 33 is not directed vertically so that the liquid jet squirted into the chamber encloses an angle deviating from 0° between the liquid jet and the axial axis 74.

The invention is by no means limited to the above-described exemplary embodiments. Thus, there may also be used other types of swirl chambers which are not of tubular design. Also, the tubular chamber may be of conical, instead of cylindrical design. Here it is conceivable that the open end lying near the top of the cone is closed so that the open end lying near the part of the chamber with the greatest diameter is not closed for dispensing the beverage. In this example, the air inlet 30 discharges into the liquid flow channel 33. It is also conceivable, however, that the air inlet 30 discharges directly into the chamber 14. To this end, the inner wall 24 may be provided with an air feed opening, all this quite analogous to the air feed opening 34, which is arranged in the inner wall 32 of the liquid flow channel 33. In this example, the nozzle and the collecting unit are mechanically connected with each other and of integrated design. This has the advantage that the combination of nozzle and collecting unit may be of compact design. Moreover, the liquid flow path the beverage must travel from the outlet 4 to the cups 63 and 64 is thus shortened so that the dripping after is likewise shortened. This, however, is not necessary. Nozzle and collecting unit may also be separated from each other. Furthermore, to even further shorten the dripping after, the outlet 4 may, for instance, be directly connected with the outlet 20. In particular, the holder 4, the nozzle 8 and the collecting unit 10 may be mechanically connected with each other and thus form the unit 70. Furthermore, in each of the above-described embodiments, the jet may also be directed radially in the tubular chamber so that an extra forceful impact of the jet on an inner wall of the chamber is obtained.

In this example, an apparatus for preparing coffee with a fine-bubble froth layer has been described. The beverage unit 2 of FIG. 5 may, however, be replaced by another known beverage unit for feeding under pressure other kinds of beverage to the inlet of the nozzle, such as hot milk, hot tea and the like. Such variants are each considered to fall within the scope of the invention.

The invention claimed is:

1. An apparatus for preparing a consumable beverage with a fine-bubble froth layer comprising:
   a beverage unit for dispensing under pressure the beverage to be processed,
   at least one nozzle, which is in fluid communication with the beverage unit for feeding the beverage to the nozzle to generate a jet of the beverage by the nozzle, and
   a collecting unit having a tubular chamber with at least one open end for dispensing the beverage with the fine-bubble froth layer, and an inner wall shaped substantially as a body of revolution,
   wherein the nozzle and the collecting unit are in fluid communication such that the jet is oriented to impact the inner wall of the tubular chamber for beating air into the beverage to obtain the fine-bubble froth layer, which, then in use, leaves the tubular chamber via the at least one open end.

2. An apparatus for preparing a consumable beverage with a fine-bubble froth layer comprising:
   a beverage unit for dispensing under pressure a the beverage to be processed,
   at least one nozzle, which is in fluid communication with the beverage unit for feeding the beverage to the nozzle to generate a jet of the beverage, and
   a collecting unit having a swirl chamber with at least one outlet opening for dispensing the beverage with the fine-bubble froth layer and an inner wall shaped substantially as a body of revolution,
   wherein the nozzle and the collecting unit are in fluid communication such that the jet is oriented to impact the inner wall of the swirl chamber for beating air into the beverage to obtain the fine-bubble froth layer, which, in use, leaves the swirl chamber via the at least one outlet opening.

3. An apparatus according to claim 2, wherein the swirl chamber is of tubular design, the tubular chamber being provided with at least one open end, which comprises the at least one outlet opening.

4. An apparatus according to claim 3, wherein the inner wall of the tubular chamber has the shape of a cylinder.

5. An apparatus according to claim 3, wherein the inner wall of the tubular chamber is at least partly substantially designed according to the shape of a cylinder or cone.

6. An apparatus according to claim 5, wherein the nozzle is oriented relative to the collecting unit in such a manner that, in use, the jet is directed tangentially or radially relative to the inner wall.

7. An apparatus according to the claim 6, wherein the tubular chamber is provided with two open ends.

8. An apparatus according to claim 7, wherein the inner wall is provided with a beverage feed opening for feeding, from outside the chamber, the jet to the chamber.

9. An apparatus according to claim 8, wherein the collecting unit or a fluid connection between the nozzle and the tubular chamber is provided with at least one air inlet for, in use, drawing air into the chamber.

10. An apparatus according to claim 9, wherein an inner wall of a liquid flow channel from the nozzle to the tubular chamber is provided with an air feed opening, which forms part of the air inlet.

11. An apparatus according to claim 10, wherein the air feed opening is arranged in the collecting unit.

12. An apparatus according to claim 11, wherein the nozzle and the collecting unit are mechanically connected with each other.

13. An apparatus according to claim 12, wherein the nozzle and the collecting unit are of integrated design.

14. An apparatus according to claim 13, wherein the nozzle is provided with at least one spray mouth.

15. An apparatus according to claim 14, wherein the spray mouth is located upstream relative to the beverage feed opening.

16. An apparatus according to claim 15, wherein a longitudinal axis of the tubular chamber is inclined downward in the direction of the at least one open end.

17. An assembly of the nozzle and the collecting unit of the apparatus according to claim 16.

18. The apparatus of claim 1 wherein the jet is oriented to tangentially impact the inner wall of the tubular chamber.

* * * * *